Feb. 16, 1932.   L. D. SOUBIER   1,845,635
APPARATUS FOR FEEDING MOLTEN GLASS
Filed Feb. 18, 1928   6 Sheets-Sheet 2

Feb. 16, 1932. L. D. SOUBIER 1,845,635
APPARATUS FOR FEEDING MOLTEN GLASS
Filed Feb. 18, 1928 6 Sheets-Sheet 5

Patented Feb. 16, 1932

1,845,635

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

APPARATUS FOR FEEDING MOLTEN GLASS

Application filed February 18, 1928. Serial No. 255,221.

The present invention relates to improvements in apparatus for separating molten glass into mold charges for delivery by gravity to ware forming molds.

An object of the invention is to provide novel means to accurately control the size, weight and shape of mold charges suspended from the walls of a bottom outlet orifice of a container and thereby obtain improved quality ware. To this end, the invention in its preferred embodiment, includes a rotary flow regulator projecting into a bottom outlet orifice and formed with an opening through which molten glass is expelled by a force applied to glass at one side of the regulator at regular intervals.

Another object is to provide means to vary the area of the inlet end of an opening through the flow regulator to thereby permit control of the volumes of glass entering said opening for discharge and formation into mold charges. Thus, the size and weight of the suspended mold charges may be controlled.

A further object is to so position a flow regulating member in a bottom outlet opening in a container for molten glass that the glass issuing through an annular passageway between the wall of the bottom outlet opening and the flow regulator, forms a skin or film providing a sack to enclose the hot and more fluent glass which issues from a measuring chamber formed in the lower end of the flow regulator.

It is also an object to provide a rotary flow regulator for the molten glass whose speed may be varied to permit acceleration or retardation of the outflow of glass and form this regulator with intercommunicating axial and lateral openings which provide a chamber for segregating predetermined volumes of glass within the supply body. Thus, the flow regulator serves a two-fold purpose and is exceptionally effective in maintaining uniformity in the size, shape and weight of mold charges being formed.

Other objects will be apparent hereinafter.

In the drawings, particularly Figs. 1 to 4, inclusive, the boot or furnace extension 10 is formed with a well or recess 11 at the front end of the floor, said well being defined in part by a transverse dam 12 or rib rising from the floor of the boot and terminating just below the normal level of the molten glass. A bottom outlet opening 13 is formed in the floor of the well 11, permitting gravity issue of molten glass for suspension from the walls of the outlet opening and separation into mold charges 14 which are severed from the issuing stream by shears 15 or the like cutters. The cover 16 is formed with a vertical opening 17 near its inner end to permit downward projection of a gate 18 or block a predetermined depth in the supply body of molten glass whereby flow of the latter may be controlled and regulated in the customary manner. This gate is adjustably mounted on a frame member 19 extending forwardly from a vertical support 20, adjustable connection between said gate and frame member 19 being effected by a rod 21 extending upwardly through said member and having an adjusting hand wheel 22 threaded on its upper end above said member 19. Suitable burners 111 may be projected into the boot to apply heat to the glass adjacent the plunger 60 for an obvious purpose.

Figure 1:
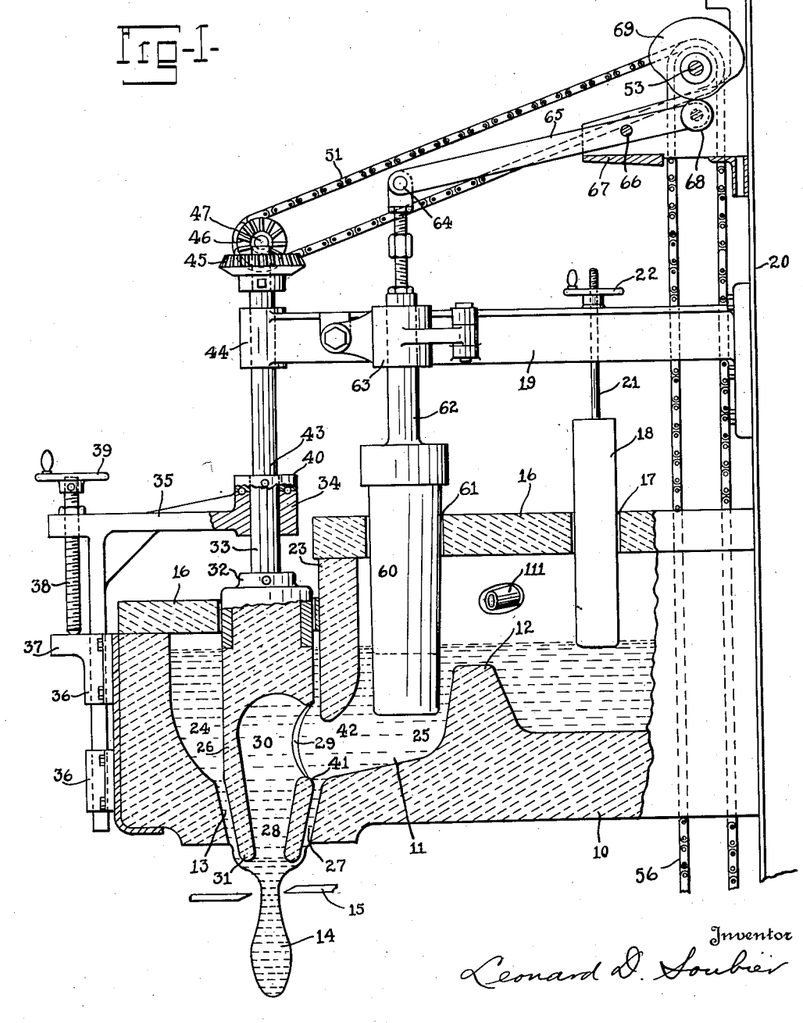
Fig. 1 is a vertical longitudinal sectional view with parts in elevation, showing a feeder embodying my invention.
Figure 2:
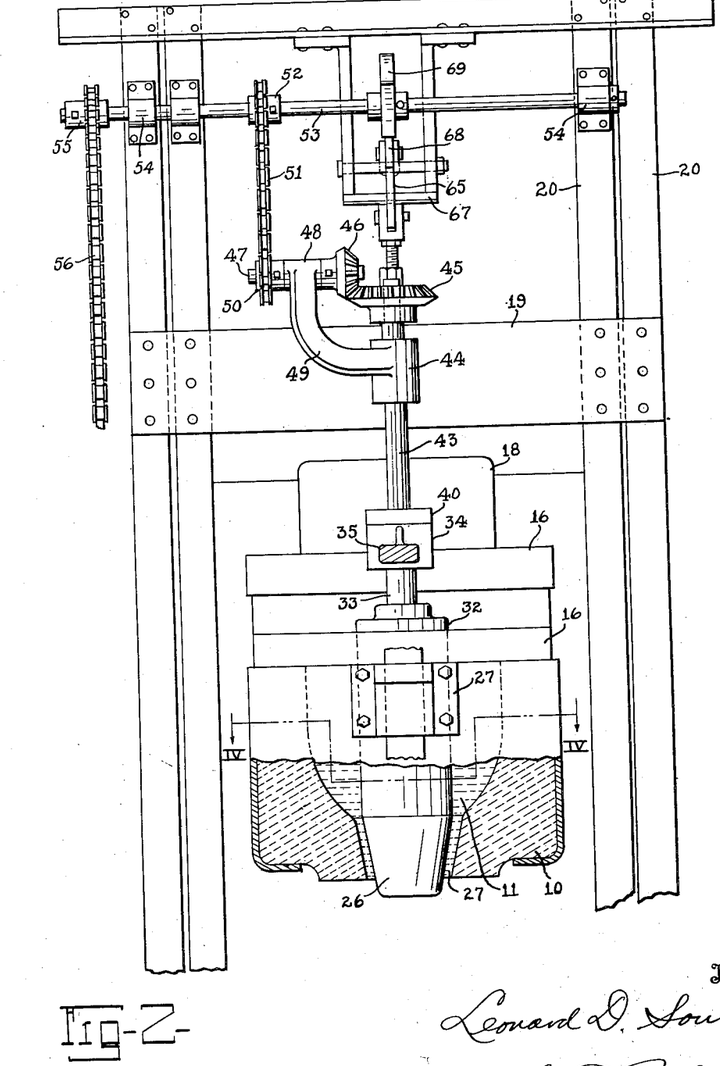
Fig. 2 is a front elevation thereof with parts in section.
Figure 3:
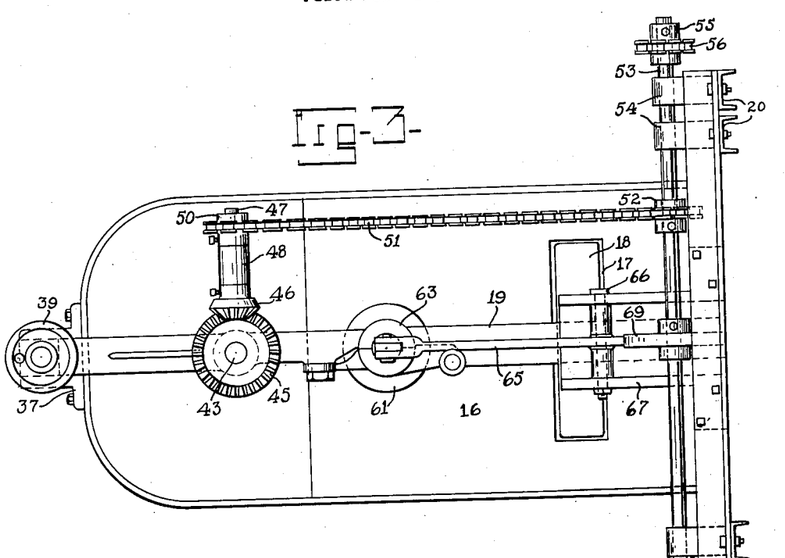
Fig. 3 is a plan view.
Figure 4:
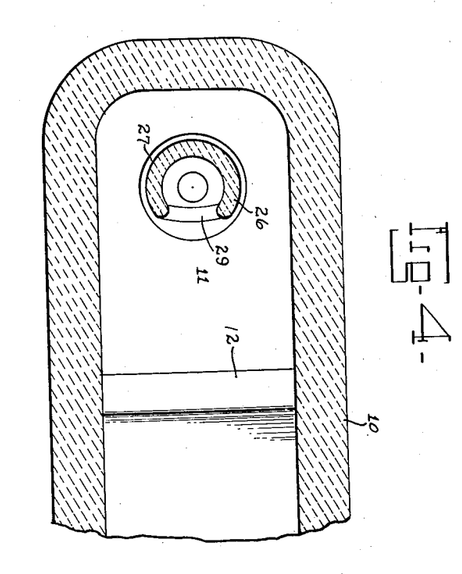
Fig. 4 is a fragmentary sectional view taken substantially along the line IV—IV of Fig. 2.

The forward end of the boot is decreased in height and the cover portion 16 positioned quite close to the upper surface of the glass in the well 11 to thereby provide for more effective heating of the glass in this area. The cover blocks 16 form reflectors for heat radiated from the glass surface and by positioning these blocks in proximity to the surface of the glass, the effectiveness of the radiated heat is materially increased with the result that the glass is maintained in exceptionally good condition throughout for working. A stationary partition wall 23 projects into the well 11, dividing the latter into two chambers, communicating with each other through an opening 42, one chamber 24 to accommodate a glass flow regulating member 26 and the other chamber 25 to accommodate a plunger 60 as will be described presently.

The glass flow regulator 26 or valve is in the form of an elongated member comprised of refractory material and having a tapered lower end whose exterior surface may be parallel with the wall of the bottom outlet opening 13 and form with the latter an annular passageway 27. An axial opening 28 in the lower end of the regulating member 26 communicating with a lateral opening 29 therein, provides communication between the well 11 and the atmosphere. These two openings lead to a measuring chamber 30 having a predetermined capacity and adapted to be continuously filled with molten glass supplied thereto from the mass of glass in the well 11. It is to be noted that the lateral opening 29 is positioned considerably below the glass level whereby only glass from intermediate portions of the supply body moves directly into the chamber 30. Thus, the glass entering the chamber, comprises only that best suited for working. The lower end 31 of the flow regulator 26 preferably extends below the lower end of the bottom outlet opening 13 so that the glass issuing through the annular passageway 27 is exposed to the chilling effect of the atmosphere and will form a film or skin which, in effect, provides a sack into which the extremely hot glass flows from the chamber 30 by way of the axial opening 28.

The flow regulator 26 is fixed in a chuck 32 carried at the lower end of a rod 33 which extends upwardly through a bearing 34 in a bracket arm 35, vertically adjustable in guideways 36 at the front end of the boot. The upper guideway is formed with a stop 37 against which the lower end of an adjusting screw 38 bears, the latter carried by said bracket arm 35 and including a hand wheel 39 employed to rotate the screw 38 and thereby vary the elevation of the flow regulator. The rod 33 carries at its upper end a head 40 which bears against ball bearings on the upper side of the bearing block 34. By adjusting the flow regulator 26 vertically, the spacing between the outer face of the tapered portion of the regulator and the wall of the bottom outlet opening 13 is varied so that the thickness of the skin or film formed from the glass issuing through the annular passageway 27 may be varied. Also, the spaced relation between the lower wall 41 of the lateral opening 29 and the upper side of the opening 42 in the wall or partition block 23 is varied to thereby further control the rate of flow of molten glass into the chamber 30.

A shaft 43 is connected to the upper end of the rod 33 (Fig. 1) and extends vertically upward through a bearing 44 in the outer end of the frame member 19. This shaft 43 (Fig. 2) carries a bevel gear 45 above the bearing 44 running in mesh with a pinion 46 on one end of a stub shaft 47. This stub shaft 47 (Fig. 2) is journalled in a bearing 48 on a bracket 49 and carries a sprocket 50 which is driven through a sprocket chain 51 by a sprocket wheel 52 on a continuously rotating cam shaft 53. This shaft is mounted in bearings 54 on the vertical frame members 20 and carries at one end a sprocket 55 over which a driving chain 56 is trained.

A plunger 60 projects into the glass through an opening 61 in the boot cover 16 directly over the chamber 25. This plunger is reciprocated in timed relation to movements of the flow regulator 26 and, as will be apparent hereinafter, moves downwardly simultaneously with register of the lateral opening 29 with the passageway below the partition wall 23. The plunger 60 is carried by a plunger rod 62 extending vertically through a two part separable bearing 63 and is pivoted at its upper end to a lever 65 by a pin 64. This lever 65 (Figs. 1 and 2) is pivoted by a pin 66 to a bracket 67 and carries a cam roll 68 at its inner end for continuous contact with a cam roll 69 suitably fixed to the aforementioned cam shaft 53. Thus, it is seen that the cam shaft 53 serves the twofold purpose of continuously rotating the flow regulator 26 and reciprocating the plunger 60 in proper timed relation to movement of the flow regulator. By changing the rotary speed of the member 26, the lengths of time during which the opening 29 faces the passageway 42 may be varied to control the sizes of the formed charges of glass.

The operation of this form may be described as follows:

Assuming that molten glass is continuously flowing into the well 11 from the inner end of the boot or furnace extension to maintain the chamber 30 in the member 26 filled with molten glass, the flow regulating member 26 is rotated to regulate the rate of discharge of glass through the annular opening 27 and the axial opening 28 leading downwardly from the chamber 30. At regular intervals, the lateral opening 29 is brought to a position in which it faces the plunger 60 and while so positioned, the plunger is moved downwardly to thereby apply pressure to the glass below said plunger and entirely along a path leading beneath the partition wall 23 and through the chamber 30 and axial opening 28. Thus, issue of the glass through the bottom outlet is accelerated. The speed of rotation of the regulating member 26 predetermines the length of the periods during which the lateral opening 29 is in register with the opening 42 through the partition wall 23, thereby controlling the effectiveness of the plunger 60 as a glass expelling medium. Thus, the size and weight of the suspended charges may in part be regulated. As the flow regulating member 26 continues to rotate and turns the lateral opening 29 away from the plunger 60, the latter moves upwardly to thereby apply a flow retarding force to the glass in the chamber 25 and adjacent areas to thereby neck in the upper portion of the issued glass for severance by shears 15 or other suitable cutting means. As has been previously stated, that portion of the glass issuing from the annular passageway 27 is chilled and forms a sack into which the extremely hot glass issuing from the axial opening 28 is deposited.

In another form of the invention, as shown in Figs. 5 to 8 inclusive, the flow regulator projecting into the bottom outlet opening cooperates with a pair of plungers which are subjected to both rotation and reciprocation for purposes hereinafter apparent.

Figure 5:
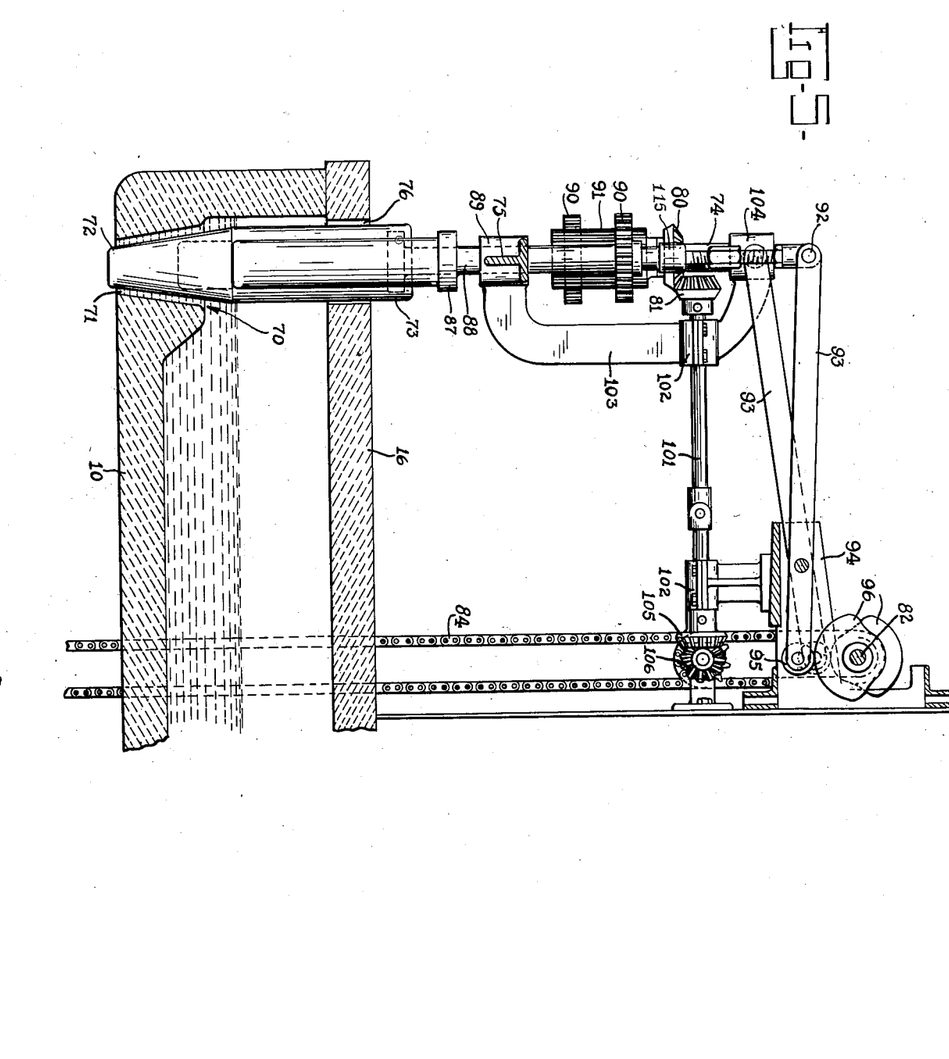
Fig. 5 is a vertical longitudinal sectional view with parts in elevation, showing another form of the invention.

In this form of invention, the floor of the furnace extension 10 is raised at its forward end and provided with a transversely extending relatively narrow depression or well 70. A downwardly tapered bottom outlet opening 71 is formed centrally in the bottom of the well to accommodate the downwardly tapered end 72 of a flow regulating member 73 which is fixed to the lower end of a shaft 74 extending vertically upward through a supporting cross bar 75. An opening 76 in the boot cover 16 permits projection of said member downwardly into the boot. A chamber 77 in the lower end of the regulating member 73 communicates with the atmosphere through an axial opening 78 and through a lateral opening 79 with the interior of the well below the level of the molten glass contained in the well. The tapered lower end 72 of the regulating member 73 is spaced from the wall of the outlet opening 71 to form an annular passageway through which a relatively thin film of glass issues to form a sack to receive the hotter glass issuing through the axial opening 78.

A gear 80 (Figs. 5 and 6) is fixed to the rod 74 above the transverse supporting bar 75 and running in mesh with a pinion 81 on a sectional horizontal shaft 101 journalled in bearings 102. One of these bearings 102 (Fig. 5) is carried by an arm 103 rising from the transverse supporting bar 75 and mounts a bearing 104 at its upper end to receive the upper portion of the shaft 74. The inner end of the horizontal shaft 101 carries a bevel gear 105 running in mesh with a pinion 106 continuously rotated by a cam shaft 82 through a sprocket chain 83, the latter being trained over sprockets 107. The cam shaft 82 is continuously driven by any suitable means (not shown) operating through a sprocket chain 84 and a sprocket 108. Thus, the regulating member 73 is subject to continuous rotation at speeds which may be regulated and controlled to meet various operating conditions. The cross bar 75 is carried by supporting rods 85 which are vertically adjustable in bearings 86, such adjustability providing for variations in the elevation of the tapered lower end 72 of the regulating member 73 by which the area of the annular passageway between said member and the wall of the bottom outlet opening may be varied to thereby regulate the issuance of glass therethrough.

Figure 6:
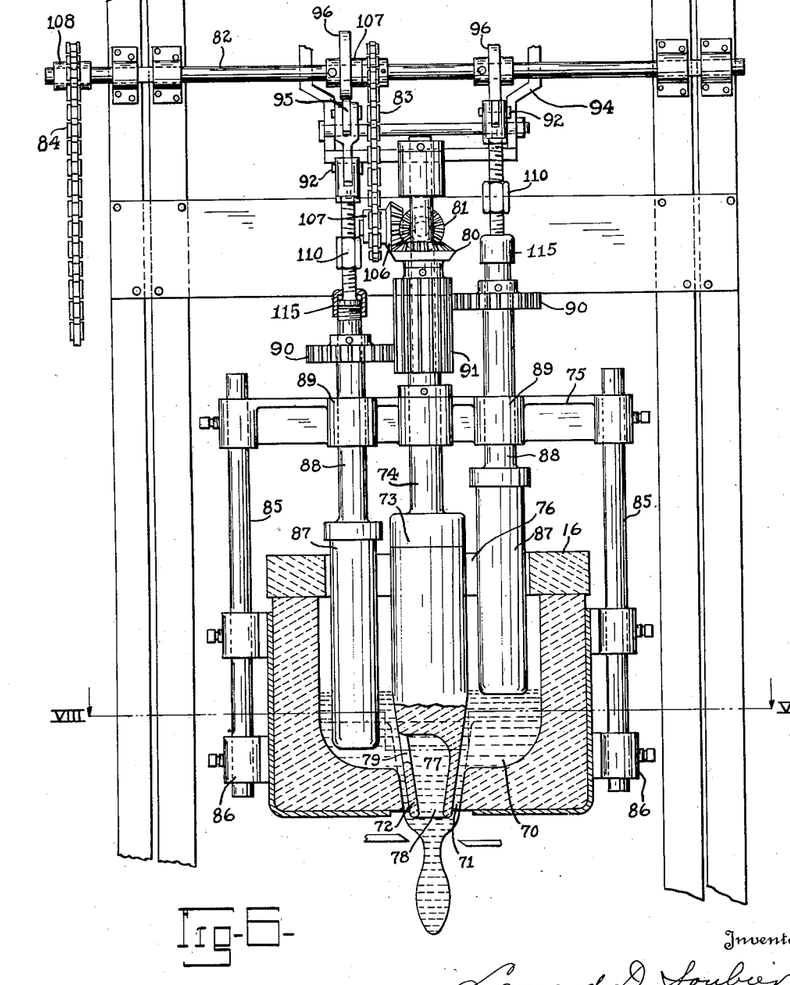
Fig. 6 is a transverse sectional elevation of the form shown in Fig. 5.
Figures 7, 8:
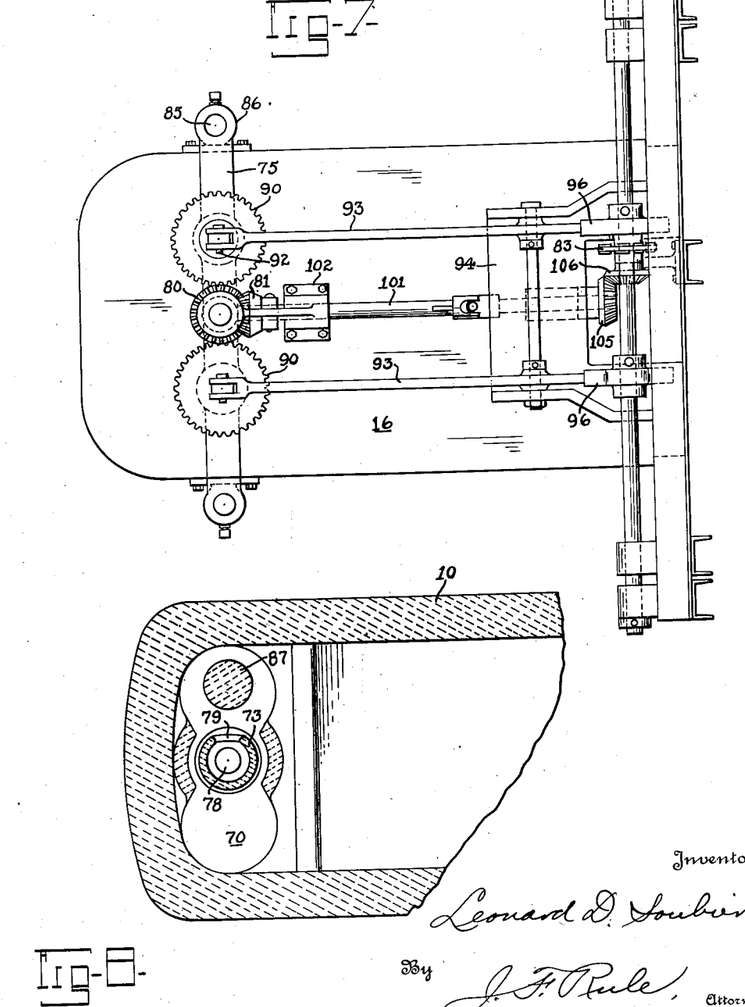
Fig. 7 is a plan view of the same.
Fig. 8 is a horizontal sectional view taken substantially along the line VIII—VIII of Fig. 6.

A pair of plungers 87 extend into the boot through the transverse slot 76 in the boot cover 16 in vertical alignment with the transverse well 70 and at opposite sides of and quite close to said regulating member 73. These plungers 87 are carried by shafts 88 extending vertically upward through bearings 89 in the supporting cross bar 75. Spur gears 90 are fixed to the shafts 88 above said cross bar 75 and run in mesh with a gear 91 carried by the flow regulator supporting rod 74. These shafts 88 are connected at their upper ends by pins 92 to the forward ends of levers 93 which are fulcrumed to supporting brackets 94 adjacent their inner ends, the latter carrying cam rolls 95 continuously running in contact with cams 96. An adjustable link connection 110 is provided at the upper end of each shaft 88 to allow vertical adjustment of the plungers whereby their glass expelling effectiveness may be controlled. The upper ends of the shafts 88 are connected by swivels 115 to the lower ends of the adjustable connectors 110 to permit rotation of the plungers 87. The cams 96 are fixed to the aforementioned transverse cam shaft 82 and are continuously rotated thereby. These cams 96 are so positioned upon the shaft 82 that their continuous rotation causes the plungers 87 to move downwardly into the glass one at a time, such downward movement being so controlled that it takes place while the lateral opening 79 in the flow regulator 73 faces the downwardly moving plunger. Thus, with one complete revolution of the flow regulator, each plunger projects once into the glass and causes suspension of a mold charge of glass from the walls of the outlet and the lower tapered end of said regulator. The speed of rotation of the regulating member 73 may be regulated and controlled to vary the degree of centrifugal force applied to the glass in proximity thereto so that the rate of issue of glass is further controllable.

Modifications may be resorted to within the spirit and scope of the appended claims.

What I claim is:

1. In apparatus for feeding molten glass, the combination with a container for the glass provided with a bottom outlet opening, of a rotatable member in vertical alignment with the bottom outlet opening and provided with an axial opening extending through the lower end of said member and with a lateral opening providing communication between the axial opening and the interior of the container, and means positioned at one side of said member to periodically apply an expelling force to glass in the inter-communicating openings.

2. In apparatus for feeding molten glass, the combination with a container for the glass provided with a bottom outlet opening, of a rotatable member in vertical alignment with the bottom outlet opening and provided with an axial opening extending through the lower end of said member and with a lateral opening providing communication between the axial opening and the interior of the container, and means positioned at one side of said member and operable while the lateral opening faces said means to apply an expelling force to glass in said inter-communicating openings.

3. In apparatus for feeding molten glass, the combination with a container for the glass provided with a bottom outlet opening, of a rotatable member in vertical alignment with the bottom outlet opening and provided with an axial opening extending through the lower end of said member and with a lateral opening providing communication between the axial opening and the interior of the container, and a reciprocable plunger projecting into the glass at one side of the rotatable member to apply an expelling force to glass in the inter-communicating openings at regular intervals.

4. In apparatus for feeding molten glass, the combination with a container for the glass provided with a bottom outlet opening, of a rotatable member in vertical alignment with the bottom outlet opening and provided with an axial opening extending through the lower end of said member and with a lateral opening providing communication between the axial opening and the interior of the container, means positioned at one side of said member to periodically apply an expelling force to glass in the inter-communicating openings, and means to vary the elevation of said member relative to the pressure applying means to thereby control the rate at which the glass issues from the container.

5. In apparatus for feeding molten glass, the combination with a container for the glass provided with a downwardly tapering bottom outlet orifice, of a rotatable member formed with a downwardly tapering lower end projecting into and axially aligned with said bottom outlet orifice, said member formed with inter-communicating lateral and axial openings, the latter extending through the lower end of said member, means to adjust said member vertically to thereby form an annular passageway between the tapered lower portion of said member and the well of the bottom outlet orifice, and means positioned at one side of said member to apply pressure to glass in said openings and in proximity thereto to expel glass through the axial opening and annular passageway at regular intervals.

6. In apparatus for feeding molten glass, the combination with a container for the glass provided with a downwardly tapering bottom outlet orifice, of a rotatable member formed with a downwardly tapering lower end projecting into and axially aligned with said bottom outlet orifice, said member formed with inter-communicating lateral and axial openings, the latter extending through the lower end of said member, means to adjust said member vertically to thereby form an annular passageway between the tapered lower portion of said member and the well of the bottom outlet orifice, means positioned at one side of said member to apply pressure to glass in said openings and in proximity thereto to expel glass through the axial opening and annular passageway at regular intervals, and means immediately below the bottom outlet orifice to sever issued portions of glass from the supply body.

7. In apparatus for feeding molten glass, the combination with a container for the glass provided with a downwardly tapering bottom outlet orifice, of a rotatable member formed with a downwardly tapering lower end projecting into and axially aligned with said bottom outlet orifice, said member formed with inter-communicating lateral and axial openings, the latter extending through the lower end of said member, means to adjust said member vertically to thereby form an annular passageway between the tapered lower portion of said member and the well of the bottom outlet orifice, and means positioned at one side of said member to apply pressure to glass in said openings and in proximity thereto to expel glass through the axial opening and annular passageway at regular intervals, the lower end of said member projecting below the bottom outlet orifice to provide a surface for cooperation with the atmosphere in chilling glass issuing from the annular passageway whereby said glass forms a container for the hotter glass issuing from said axial opening.

8. In apparatus for feeding molten glass, the combination with a container for the glass provided with a well near its forward end and a bottom outlet orifice in said well, of a partition extending across the well rearwardly of the bottom outlet orifice and having a transverse opening through its lower end adjacent the bottom outlet orifice, a plunger movable at regular intervals into the well rearwardly of said partition to move glass through said transverse opening for issue through said bottom outlet orifice, a rotatable member projecting into the glass and through said bottom outlet orifice, said rotatable member having inter-communicating axial and lateral openings in its lower end, and means to rotate said member and thereby periodically align the lateral opening in said member with the transverse opening through said partition.

9. In apparatus for feeding molten glass, the combination with a container for the glass provided with a well near its forward end and a bottom outlet orifice in said well, of a partition extending across the well rearwardly of the bottom outlet orifice and having a transverse opening through its lower end adjacent the bottom outlet orifice, a plunger movable at regular intervals into the well rearwardly of said partition to move glass through said transverse opening for issue through said bottom outlet orifice, a rotatable member projecting into the glass and through said bottom outlet orifice, said rotatable member having inter-communicating axial and lateral openings in its lower end, means to rotate said member and thereby periodically align the lateral opening in said member with the transverse opening through said partition, and means to adjust said member vertically to vary the area of the passageway for glass entering the axial opening.

Signed at Toledo, in the county of Lucas and State of Ohio, this 15th day of February, 1928.

LEONARD D. SOUBIER.